United States Patent

[11] 3,633,439

[72] Inventor Robert E. Annis
    Howell, Mich.
[21] Appl. No. 64,978
[22] Filed Aug. 19, 1970
[45] Patented Jan. 11, 1972
[73] Assignee General Motors Corporation
    Detroit, Mich.

[54] TRANSMISSION CONTROL
    3 Claims, 2 Drawing Figs.

[52] U.S. Cl.................................................. 74/751,
    74/731, 74/869
[51] Int. Cl..................................................F16h 47/00,
    F16h 3/74, B60k 21/10

[50] Field of Search........................................... 74/869,
    751, 731

[56] References Cited
    UNITED STATES PATENTS
    2,946,241  7/1960  Synder ........................ 74/751 X
    3,303,726  2/1967  Christenson.................. 74/751

*Primary Examiner*—Arthur T. McKeon
*Attorneys*—W. E. Finken, A. M. Heiter and R. L. Phillips

ABSTRACT: An automatic transmission control having a transition valve controlled by a transmission gearing member to maintain one transmission drive engaged to drive a load until another transmission drive is established with sufficient torque capacity to drive the load.

PATENTED JAN 11 1972

3,633,439

INVENTOR.
Robert E. Annis
BY
Ronald L. Phillips
ATTORNEY 3,633,439

TRANSMISSION CONTROL

This invention relates to transmissions and more particularly to transmission controls for providing shifting without drive interruption.

The transmission control according to the present invention has a transition valve that controls an exhaust of a shift valve to time the disengagement of one drive with the engagement of another drive. In the transmission's gearing arrangement there is a member which undergoes load reversal during shifting between these drives and this member is used to control the transition valve so that the fluid pressure effecting establishment of the one transmission drive is maintained on a shift until the other transmission drive is established with sufficient torque capacity to drive the load.

An object of the present invention is to provide a new and improved transmission control.

Another object is to provide a transmission control that maintains one transmission drive until another transmission drive is established with sufficient torque capacity to drive a load by control of a transmission gearing member which undergoes load reversal during such shifting.

Another object is to provide in a transmission control for a transmission including gearing having a member which undergoes load reversal during shifting, a transition valve that cooperates with a shift valve to maintain a fluid pressure bias effecting establishment of the one transmission drive to drive a load only until another transmission drive is established with sufficient torque capacity to drive the load.

These and other objects of the invention will be more apparent from the following description and drawing in which.

TRANSMISSION DRIVE TRAIN ARRANGEMENT

Figure 1:
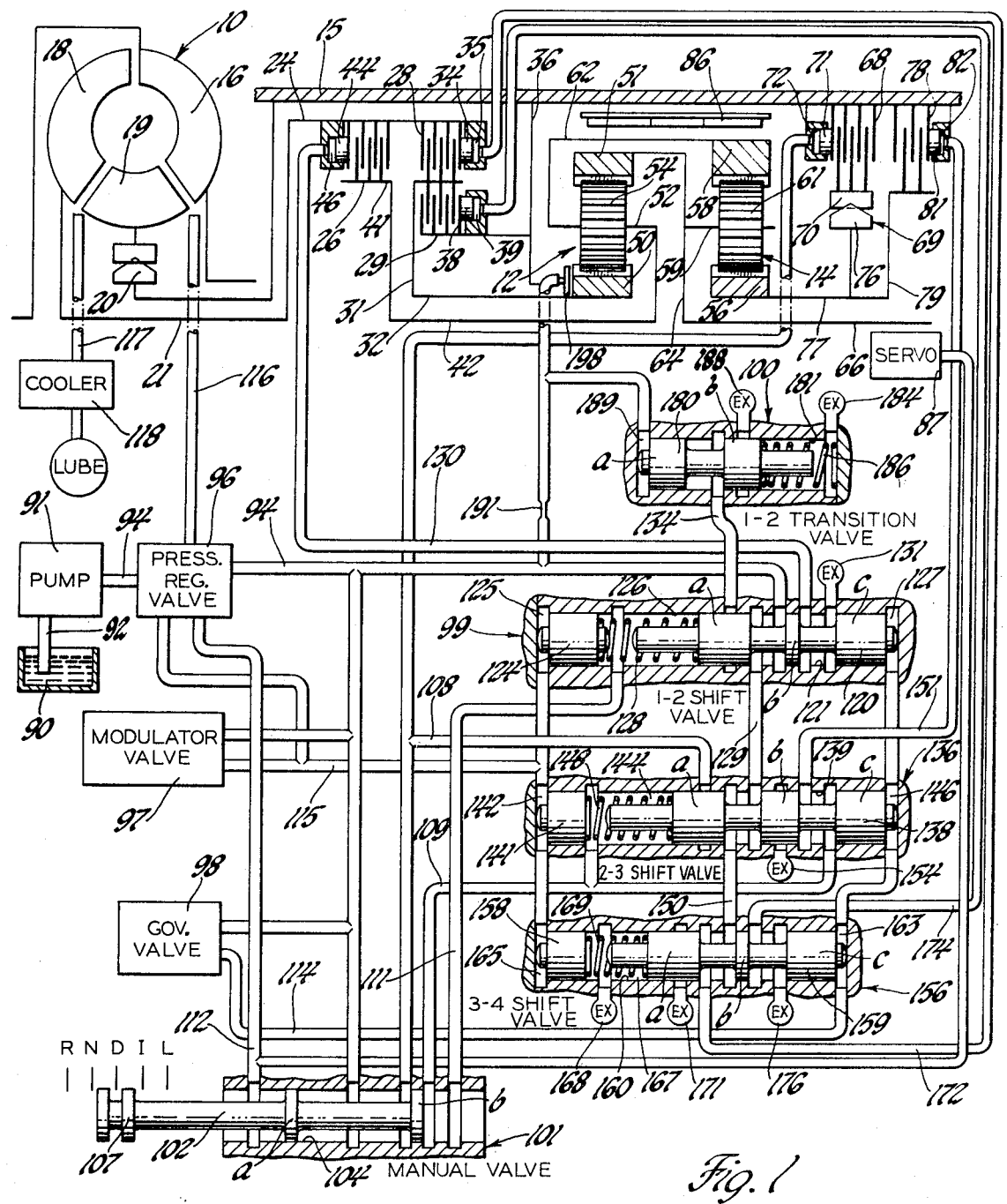
FIG. 1 is a schematic view of a transmission drive train and control system therefor according to the present invention.

The control system according to the present invention is particularly suited for controlling vehicle transmissions of the type shown in FIG. 1. The transmission's drive train arrangement generally comprises a hydrodynamic torque converter 10, planetary gear sets 12 and 14 and a plurality of fluid pressure operated drive establishing devices all housed in a transmission housing 15. The transmission is operable to provide four forward drives, neutral and a reverse drive. The forward drives are provided by two gear reduction drives, a direct drive and a geared overdrive.

Describing now the train arrangement's details beginning at the front end, the hydrodynamic torque converter 10 is of a conventional three-element type having a pump 16, a turbine 18, and a stator 19 which is groundable to the transmission housing by a one-way brake 20. The pump 16 is adapted to be driven by the vehicle's engine and the turbine 18 is connected to a converter output shaft 21. When the engine is operating to power converter 10, the converter operates to drive the converter output shaft 21 in what will be described as the forward direction by providing torque multiplication from stall up to coupling speed and fluid coupling operation thereafter.

Converter output shaft 21 which serves as the input shaft to the planetary gearing, is connected at its rear end to a drum 24 in which is located two clutches 26 and 28 and a brake 29. The clutch 28 comprises a friction plate pack in which alternate plates are splined to drum 24 and the remaining plates are splined to a hub 31 that is connected to the front end of a sleeve shaft 32. A piston 34 mounted in a cylinder in drum 24 is urged on delivery of fluid under pressure to a chamber 35, to engage the plates of clutch 28 and thus connect the converter output shaft 21 to shaft 32. Suitable retraction springs, not shown, bias piston 34 towards its clutch release position.

The brake 29 comprises a friction plate pack in which alternate plates are splined to hub 31 and the remaining plates are splined to a bulkhead 36 that is rigidly secured to transmission housing 15. A piston 38 mounted in a cylinder in bulkhead 36 is urged on delivery of fluid under pressure to a chamber 39 to engage the plates of brake 29 and thus brake the shaft 32. Suitable retraction springs, not shown, bias the piston 38 towards its brake release position.

The clutch 26 comprises a friction plate pack in which alternate plates are splined to drum 24 and the remaining plates are splined to a hub 41 that is connected to the front end of a shaft 42 which extends through sleeve shaft 32. A piston 44 mounted in a cylinder in drum 24 is urged on delivery of fluid under pressure to a chamber 46 to engage the plates of clutch 26 and thus connect the converter output shaft 21 to shaft 42. Suitable retraction springs, not shown, bias the piston 44 towards its clutch release position.

In the planetary gearing, the gear set 14 is located at the rear of the transmission behind the other gear set 12. Both gear sets 12 and 14 are of the simple helical planetary gear type. The front gear set 12 comprises an annular sun gear 50, a ring gear 51 and a planet carrier 52 carrying a planet pinion 54 in mesh with sun gear 50 and ring gear 51. The sun gear 50 is connected to the rear end of sleeve shaft 32 and the carrier 52 is connected to the rear end of shaft 42. The rear gear set 14 comprises an annular sun gear 56, a ring gear 58 and a planet carrier 59 carrying a planet pinion 61 in mesh with sun gear 56 and ring gear 58. The ring gear 58 is connected to a drum 62 which is also connected to carrier 52 of the front gear set 12. Both the carrier 59 of rear gear set 14 and ring gear 51 of front gear set 12 are connected to a hub 64. Hub 64 is connected to the front end of a shaft 66 which is suitably supported in the rear end of the transmission housing 15 and serves as the transmission's output.

A brake 68 and a one-way brake 69 are connected in series for selectively holding sun gear 56 of rear gear set 14 against backward rotation. The brake 68 comprises a friction plate pack in which alternate plates are splined to transmission housing 15 and the remaining plates are splined to the outer race 70 of one-way brake 69. A piston 71 mounted in a cylinder in transmission housing 15 is urged on delivery of fluid under pressure to a chamber 72 to engage the plates of brake 68 and thus brake the outer race 70. Suitable retraction springs, not shown, bias piston 71 towards its brake release position. The one-way brake 69 which may be of any suitable conventional type has its inner race 76 connected to sun gear 56 of rear gear set 14 by a sleeve shaft 77 through which output shaft 66 extends. The directional sense of the one-way brake 69 is such that when brake 68 is engaged, the one-way brake 69 is then operable to prevent reverse rotation of sun gear 56 while permitting free forward rotation thereof.

In addition to the selective prevention of reverse rotation of sun gear 56, there is provided a brake 78 which prevents any rotation thereof. The brake 78 comprises a friction plate pack in which alternate plates are splined to transmission housing 15 and the remaining plates are splined to a hub 79. Hub 79 is connected to the rear end of shaft 77 and is thus connected to sun gear 56. A piston 81 mounted in a cylinder in transmission housing 15 is urged on delivery of fluid under pressure to a chamber 82 to engage the plates of brake 78 and thus brake sun gear 56. Suitable retraction springs, not shown, bias piston 81 towards its brake release position.

A friction band brake 86 is grounded to transmission housing 15 and is operated by a servo 87 of any suitable conventional type. The brake 86 is urged on delivery of fluid under pressure to servo 87 to engage drum 62 and thus brake carrier 52 of front gear set 12.

Describing now the operation made available by the drive train arrangement described above, neutral is established by engaging clutch 28 while all the other fluid pressure operated clutches and brakes are released. The engagement of clutch 28 readies the transmission for establishment of either forward or reverse drive as will become more apparent later, but no power from the converter output shaft 21 can be transmitted through the gearing to the transmission output shaft 66.

The first and lowest speed range forward drive is established by maintaining engagement of clutch 28 and engaging brake 68. Power from the forwardly rotating converter output shaft 21 is delivered through the engaged clutch 28 to drive sun gear 50 in front gear set 12 forwardly. The other sun gear 56 tries to rotate backwardly but is prevented from doing so by the one-way brake 69 since brake 68 is engaged. The planetary gearing, then, by compound action drives the transmission output shaft 66 in the forward direction and at a reduced speed relative to converter output shaft 21. In the first forward drive thus established, power cannot be transmitted from the output shaft to the converter 10 for engine braking because of the one-way brake 69 and thus the transmission output shaft 66 can overrun when the vehicle is coasting. In the first forward drive, the brake 78 may be engaged to prevent forward rotation of sun gear 56 to provide for reverse power transmittal and thus provide for engine braking.

The second and next higher speed range forward drive is established by maintaining engagement of brake 68, releasing clutch 28 and engaging clutch 26. Input power is now delivered through the engage clutch 26 to drive ring gear 58 of rear gear set 14 forwardly. The sun gear 56 tries to rotate backwardly but again is prevented from doing so by the one-way brake 69 since brake 68 is still engaged. Planet pinion 61 therefore walks forwardly around sun gear 56 and drives carrier 59 and connected output shaft 66 forwardly at a reduced speed but in a speed range higher than that of the first forward drive. In the second forward drive, the brake 78 may be engaged like in the first forward drive to provide for engine braking during vehicle coasting.

For the purpose of fully understanding the transmission control according to the present invention, it is necessary to know that the input driven helical sun gear 50 of the front gear set 12 is forced rearwardly or to the right by the thrust of the helix in the first forward drive and on a shift to the second forward drive, the helix forces sun gear 50 frontwardly or to the left. This load reversal of the sun gear 50 which is a member of the planetary gearing is used to time the disengagement of the first forward drive with the engagement of the second forward drive as described in more detail later.

The third and next higher speed range forward drive is established by maintaining engagement of brake 68 and clutch 26 and additionally engaging clutch 28. With clutches 26 and 28 engaged, the carrier 52 and the sun gear 50 in front gear set 12 are connected and are thus both driven in the forward direction at converter output speed. Thus, the front gear set 12 is effectively locked up and provides a 1:1 speed ratio or direct drive between the converter output shaft 21 and transmission output shaft 66. In the third forward drive, the rear gear set 14 is also locked up by its connections with the front gear set 12 and therefore the sun gear 56 in this gear set also rotates in the forward direction at converter output speed. Thus the brake 68 may remain engaged on the shift to the third forward drive since the one-way brake 69 permits forward rotation of sun gear 56. With the gearing thus locked up, engine braking is made available in this drive.

The fourth and highest speed range forward drive is established by maintaining engagement of brake 68 and clutch 26, releasing clutch 28 and engaging brake 29. Power thus remains applied to drive carrier 52 in the forward direction at input speed but now with sun gear 50 prevented from rotation by brake 29, the ring gear 51 and connected transmission output shaft 66 are driven in the forward direction at a speed higher than converter output speed. The brake 68 may remain engaged on this upshift since the one-way brake 69 permits the forward rotation of sun gear 56 that occurs in this drive. It will also be appreciated that engine braking is made available in this drive.

Reverse drive is obtained by engaging clutch 28 and brake 86. With carrier 52 of front gear set 12 thus held and sun gear 50 driven in the forward direction through clutch 28, the ring gear 51 and connected output shaft 66 are driven in the reverse direction at reduced speed. TRANSMISSION CONTROL SYSTEM The present invention is embodied in the transmission control system shown in FIGS. 1 and 2 which system is adapted to control transmission drive arrangements of the type shown in FIG. 1. Generally, the transmission control system is operable to establish the transmission in five different conditions comprising neutral, three forward drive ranges and reverse drive.

Pump

The fluid such as oil used in the control system is returned to a sump 90 via various exhausts in the system's components, the sump being located on the underside of the transmission housing 15. Fluid pressure for the control system is supplied by a positive displacement pump 91 of conventional type which is adapted to be driven by the converter's pump 16 and is thus driven when the vehicle's engine is running. The engine driven pump 91 draws fluid from sump 90 through an intake line 92 and delivers it under pressure to a main line 94. Main line 94 is always connected to deliver fluid to a main line pressure regulator valve 96, a modulator valve 97, a governor valve 98, a 1-2 shift valve 99, a transition valve 100, and a manual valve 101.

Manual Valve

The manual valve 101 determines the operation of the control system and thus that of the transmission drive arrangement and comprises a spool valve element 102 having spaced lands $a$ and $b$ of equal diameter located in a valve body bore 104. The valve element 102 is movable to five positions which are Reverse (R), Neutral (N), Drive range (D), Intermediate range (I), and Low range (L). The valve element 102 is adapted at its left end 107 to be operated through suitable conventional linkage by the operator of the vehicle who manually selects the position.

When the valve element 102 is in the D position as shown, main line 94 is connected between lands $a$ and $b$ to a drive range line 108 while the valve bore 104 to the left of land $a$ and to the right of land $b$ is exhausted through the valve bore's open ends to the sump 90. The drive range line 108 is connected to chamber 72 of brake 68. When valve element 102 is moved to the I position, main line 94 remains connected to drive range line 108 and is in addition connected between lands $a$ and $b$ to an intermediate range line 109. When valve element 102 is moved to the L position, the main line 94 remains connected between lands $a$ and $b$ to both the drive range line 108 and the intermediate range line 109 and is in addition connected between these lands to a low range line 111. When valve element 102 is moved to the N position, the main line 94 is blocked at the manual valve between lands $a$ and $b$. When the valve element 102 is moved to the R position, the main line 94 is connected between lands $a$ and $b$ to a reverse line 112 which is connected to servo 87 that operates brake 86.

Governor Valve

The governor valve 98 which receives fluid from the main line 94 is of a conventional type. Governor valve 98 is adapted to be driven by the transmission output shaft 66 and operates to provide in a governor line 114 a governor pressure which increases with increasing transmission output speed and thus vehicle speed. The governor valve 98 may, for example, be of the type disclosed in U.S. Pat. No. 2,762,384 issued to M. S. Rosenberger. For a more detailed description of the operation of the governor valve, reference may be made to the aforementioned Rosenberger patent.

Modulator Valve

The modulator valve 97 which receives fluid from the main line 94 is of a conventional type that is controlled by engine manifold pressure. Modulator valve 97 operates to provide in a modulator line 115 a modulator pressure which increases with increasing engine torque. The modulator valve 97 may, for example, be of the type disclosed in U.S. Pat. No. 3,509,784 issued to J. E. Mahoney. For a more detailed description of the operation of the modulator valve, reference may be made to the aforementioned Mahoney patent.

Pressure Regulator Valve

The pressure regulator valve 96 is of a conventional type and operates to regulate the pressure in main line 94 and also deliver fluid via a line 116 to supply converter 10. Fluid is delivered from converter 10 to a line 117 which directs the fluid through a cooler 118 and then to lubricate various components of the transmission prior to return to sump 90. The pressure regulator valve 96 is connected to receive modulator pressure from modulator line 115 and is also connected to receive main line pressure from the reverse line 112 when pressure in the latter line becomes available. Pressure regulator valve 96 operates with these signals to increase the regulated pressure in main line 94 with increasing engine torque in all of the forward drives and also to boost the regulated main line pressure in reverse drive. The pressure regulator valve 96 may, for example, be of the type disclosed in the aforementioned Mahoney patent to which reference may be made for a more detailed description.

1-2 Shift Valve

The 1-2 shift valve 99 provides for shifting between the first and second forward drives and comprises a spool valve element 120 having spaced lands $a$, $b$ and $c$ of equal diameter located in a valve body bore 121. A cylindrical plug 124 is located in the left end of bore 121 which is closed at both ends. This arrangement provides a chamber 125 at the left end of plug 124, a chamber 126 between plug 124 and valve element 120 and a chamber 127 at the right end of valve element 120. Chambers 125, 126 and 127 are connected to the modulator line 115, low range line 111 and governor line 114, respectively. A spring 128 located in chamber 126 urges plug 124 and valve element 120 apart and normally yieldingly holds valve element 120 in a downshift position as shown. In the downshift position, the main line 94 is connected between lands $a$ and $b$ to a 2-3 line 129 while a line 130 connected to chamber 46 of clutch 26 is connected between lands $b$ and $c$ to an exhaust port 131 and an exhaust line 134 whose purpose is described in more detail later is blocked by land $a$. Governor pressure in chamber 127 acts leftward on valve element 120 to provide an upshift bias opposing the downshift bias provided by spring 128 and the modulator pressure in chamber 125 acting rightward on plug 124. When the upshift bias is sufficient to overcome the downshift bias, valve element 120 moves leftward to an upshift position. In the upshift position, the exhaust port 131 is blocked by land $c$, main line 94 is connected between lands $b$ and $c$ to line 130 and the exhaust line 134 is connected between lands $a$ and $b$ to the 2-3 line 129.

2-3 Shift Valve

A 2-3 shift valve 136 provides for shifting between the second and third forward drives and comprises a spool valve element 138 having spaced lands $a$, $b$ and $c$ of equal diameter located in a valve body bore 139. A cylindrical plug 141 is located in the left end of bore 139 which is closed at both ends. This arrangement provides a chamber 142 at the left end of plug 141, a chamber 144 between plug 141 and valve element 138 and a chamber 146 at the right end of valve element 138. The chambers 142, 144 and 146 are connected to the modulator line 115, intermediate range line 109 and governor line 114, respectively. A spring 148 located in chamber 144 urges plug 141 and valve element 138 apart and normally yieldingly holds valve element 138 in a downshift position as shown. In the downshift position, the 2-3 line 129 is connected between lands $a$ and $b$ to a 3-4 line 150 and the intermediate range line 109 is connected between lands $b$ and $c$ to a line 151 that is connected to chamber 82 of brake 78 while lands $a$ and $b$ block drive range line 108 and an exhaust port 154, respectively. When the upshift bias provided by governor pressure in chamber 146 acting leftward on valve element 138 is sufficient to overcome the downshift bias provided by spring 148 and modulator pressure in chamber 142 acting rightward on plug 141, valve element 138 is moved leftward to an upshift position. In the upshift position the drive range line 108 is connected between lands $a$ and $b$ to the 3-4 line 150, the line 151 is connected between lands $b$ and $c$ to exhaust port 154, and the intermediate range line 109 is blocked by land $c$.

3-4 Shift Valve

A 3-4 shift valve 156 provides for shifting between the third and fourth forward drives and comprises a cylindrical plug 158 and a spool valve element 159 having spaced lands $a$, $b$ and $c$ of equal diameter located in a valve body bore 160. The right end of bore 160 is closed to provide a chamber 163 which is connected to governor line 114 and the left end of the valve bore is closed to provide a chamber 165 that is connected to modulator line 115. A chamber 167 between plug 158 and valve element 159 is connected to an exhaust port 168. A spring 169 located in chamber 167 urges plug 158 and valve element 159 apart and normally yieldingly holds valve element 159 in a downshift position as shown. In the downshift position an exhaust port 171 is blocked by land $a$, the 3-4 line 150 is connected between lands $a$ and $b$ to a line 172 that is connected to chamber 35 of clutch 28 and a line 174 which is connected to chamber 39 of brake 29 is connected between lands $b$ and $c$ to an exhaust port 176. When the upshift bias provided by governor pressure in chamber 163 acting leftward on valve element 159 overcomes the downshift bias provided by spring 169 and modulator pressure in chamber 165 acting rightward on plug 158, the valve element 159 is moved leftward to an upshift position in which the line 172 is connected between lands $a$ and $b$ to exhaust port 171, the 3-4 line 150 is connected between lands $b$ and $c$ to line 174, and exhaust port 176 is blocked by land $c$.

Sequential shifting by the shift valves 99, 136 and 156 is effected by their respective springs having a relatively low, intermediate and high preload. Thus, the shift valves 99, 136 and 156 will shift at relatively low, intermediate and high governor pressures and thus vehicle speeds, respectively, assuming the modulator bias remains constant.

1-2 Transition Valve

Figure 2:
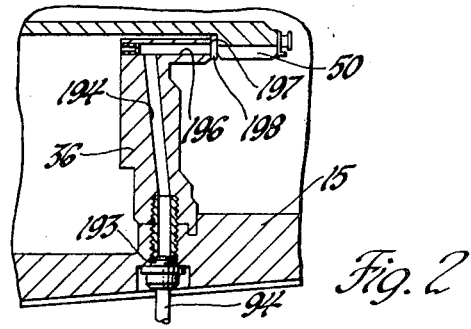
FIG. 2 is a partial sectional view of an actual construction of part of the transmission drive train and control system shown schematically in FIG. 1.

The 1-2 transition valve controls the transition from first to second forward drive and comprises a spool valve element 180 having spaced lands $a$ and $b$ of equal diameter located in a valve body bore 181. The bore 181 to the right of land $b$ is exhausted by an exhaust port 184 and accommodates a spring 186 which urges the valve element 180 to the position shown which will be called a shift-prevent position for reasons which will become more apparent later. In the shift-prevent position, the exhaust line 134 from the 1-2 shift valve 99 is blocked from an exhaust port 188 by land $b$. The left end of bore 181 is closed to provide a chamber 189. The main line 94 is connected through a flow restriction 191 to chamber 189 and is also connected as best shown in FIG. 2 by a threaded fitting 193 to a passage 194 drilled in bulkhead 36 of the transmission housing 15. Thus, drilled passage 194 is an extension of main line 94 downstream of flow restriction 191. The passage 194 extends radially inward, then turns and extends axially rearward toward the front gear set 12 and has an end 196 in a face 197 of bulkhead 36 that faces sun gear 50 of front gear set 12. A ring-shaped valve member 198 is located for limited axial movement between bulkhead face 197 and the left side of sun gear 50 and in cooperation with the passage end 196 provides an exhaust valve whose opening and closing is controlled by sun gear 50. When sun gear 50 is thrust rightward, fluid pressure in passage 194 transmitted through this passage's end 196 urges valve member 198 rightward with the sun gear 50 to an open position to exhaust passage 194 of fluid pressure and thus prevent pressure buildup in chamber 189 so that the 1-2 transition valve 100 remains conditioned in its shift-prevent position by its spring bias. During such pressure relief of chamber 189, the flow restriction 191 maintains the normal main line pressure upstream of this flow restriction. Alternatively, when the sun gear 50 is thrust leftward, the valve member 198 is moved by this gearing member to close passage end 196 so that pressure in chamber 189 of the 1-2 transition valve 100 then increases to full main line pressure to urge valve element 180 rightward against the spring bias to a shift-permit position in which the exhaust line 134 from the 1-2 shift valve 99 is connected between lands $a$ and $b$ to exhaust port 188.

CONTROL SYSTEM OPERATION

The control system described above is operable to provide manual selection of reverse, drive and neutral and is also operable to provide manual selection of automatic shifting between all forward drives and just between the first and second forward drives and also provides for holding the first forward drive.

Neutral Position

For initiating vehicle operation, the operation conditions the manual valve 101 in its N position and then on starting the vehicle's engine, the pump 91 delivers fluid via main line 94 to the pressure regulator valve 96, modulator valve 97, governor valve 98, 1-2 shift valve 99 and 1-2 transition valve 100. The pressure regulator valve 96 regulates the pressure in main line 94 at the desired value and also delivers fluid to the converter 10 for its operation. Modulator pressure is zero with the engine idling and the governor pressure is also zero with the vehicle stationary. The manual valve 101 blocks the main line 94 from all the lines leading from this valve and with all of the shift valves downshifted, the main line 94 is connected in cascade fashion through the shift valves via the 2-3 line 129 and 3-4 line 150 to line 172 which delivers the fluid to engage clutch 28 to thus ready the transmission for operation in either forward or reverse direction.

Reverse Drive Position

When the operator moves the manual valve 101 to its R position, the main line 94 is then connected to supply fluid to the reverse line 112 which delivers the fluid under pressure to servo 87 to engage brake 86. Reverse line 112 also transmits main line pressure to the pressure regulator valve 96 where it acts to boost the regulated main line pressure. The clutch 28 has remained engaged on the shift from neutral since all of the shift valves remain downshifted and thus the reverse drive is established to drive the vehicle.

Drive Range Position

When the operator moves the manual valve 101 to its D position, the main line 94 is then connected to supply the drive range line 108 which delivers the fluid under pressure to engage brake 68. The clutch 28 has remained engaged on the shift from neutral because all of the shift valves remain downshifted and thus the first forward drive is established to drive the vehicle forwardly.

With the first forward drive thus established and when the engine is accelerated to propel the vehicle, governor pressure is then produced in governor line 114 to urge upshift of all of the shift valves. In addition, modulator pressure is being developed in modulator line 115 by the modulator valve 97 to add to the spring biases in resisting upshifting of the shift valves. When the upshift bias is effective to overcome the downshift bias on the 1-2 shift valve 99, this valve is moved to its upshift position where it connects the main line 94 to the line 130 so that the latter line then delivers fluid under pressure to engage clutch 26. The 2-3 line 129 and thus the 3-4 line 150 and line 172 are connected to the exhaust line 134 recognizing that the 2-3 shift valve 136 and 3-4 shift valve 156 remain downshifted. For the purpose of generally describing the automatic shifting sequence, it will be assumed that the 1-2 transition valve 100 is in its shift-permit position so that the exhaust line 134 is thus connected to exhaust port 188 to permit release of the clutch 28 so that the first forward drive is released and the second forward drive is thus established.

With the 1-2 shift valve 99 in its upshift position and on continuous acceleration of the vehicle, the upshift bias on the 2-3 shift valve 136 will eventually overcome the downshift bias acting thereon to urge the 2-3 shift valve to its upshift position. In the upshift condition, the drive range line 108 is again connected to the 3-4 line 150 and thus to the line 172 to reengage clutch 28 since the 3-4 shift valve 156 remains downshifted.

With both the 1-2 and 2-3 shift valves in their upshift position establishing the third forward drive and then when the vehicle speed increases to a speed such that the upshift bias acting on the 3-4 shift valve 156 overcomes the downshift bias acting thereon, the 3-4 shift valve upshifts to connect the line 172 to exhaust port 171 to release clutch 28 while connecting the 3-4 line 150 to line 174 to engage brake 29 to establish the fourth forward drive, the line 172 being fed from the drive range line 108 via the upshifted 2-3 shift valve 136.

Sequential downshifting through all of the forward drives occurs when the governor pressure upshift biases decrease sufficiently to permit the modulator and spring downshift biases to effect reversal of the operation described above.

I Position

When the manual valve 101 is moved to its I position, the drive range line 108 remains connected to main line 94 and in addition the intermediate range line 109 is connected to main line 94. Fluid in intermediate range line 109 is delivered to chamber 144 of the 2-3 shift valve 136 to hold this valve in its downshift position. In addition, the intermediate range line 109 is connected by the 2-3 shift valve 136 to the line 151 to engage brake 78. Thus, the 1-2 shift valve remains operable to provide shifting between the first and second forward drives as described previously but upshifts to the third and fourth forward drives are prevented since the 2-3 shift valve 136 is prevented from upshifting. In addition, engine braking is then possible in the first and second forward drives since brake 78 is now engaged.

Low Range Position

When the manual valve 101 is moved to its L position, both the drive range line 108 and the intermediate range line 109 remain connected to the main line 94 and in addition the low range line 111 is connected to the main line. The low range line then delivers fluid at main line pressure to chamber 126 of the 1-2 shift valve 99 to hold this valve in its downshift position. Thus, the transmission is held in low drive since neither the 2-3 shift valve 136 nor the 3-4 shift valve 156 can upshift. Furthermore, engine braking is possible in this low drive since engagement of brake 78 is maintained by the downshifted 2-3 shift valve 136.

1-2 Transition Valve Operation

It will be recalled that in the above description of operation regarding release of the first forward drive, it was assumed that the 1-2 transition valve 100 was in its shift-permit position. Describing now the complete operation of this valve, whenever first forward drive is established with clutch 28 engaged by supply of fluid via all of the shift valves in their downshift positions and clutch 26 disengaged by the 1-2 shift valve 99, the thrust reaction of the sun gear 50 is rearward or to the right. This permits the fluid pressure in passage 194 to move valve member 198 rightward so that pressure is prevented from building in chamber 189 of the transition valve 100. With no pressure buildup in chamber 189, the spring 186 yieldingly holds the valve element 180 in its shift-prevent position blocking the 1-2 shift valve's exhaust line 134 from the exhaust port 188. Then, on a shift demand from the first to the second forward drive, which is accomplished by the 1-2 shift valve 99 moving to its upshift position, the main line 94 is opened to the line 130 to initiate engagement of clutch 26 while the line 172 is connected by the shift valves 156 and 136 and then 1-2 shift valve 99 to exhaust line 134. When chamber 46 of clutch 26 is filled and pressure starts to rise to engage this clutch, the engagement of clutch 28 is held up or maintained since the chamber 35 of clutch 28 is prevented from being exhausted by the 1-2 transition valve 100. When the pressure in chamber 46 of clutch 26 is sufficiently high enough to provide clutch 26 and thus the second forward drive with sufficient torque capacity to drive the load, the drive from the converter to the gearing switches from sun gear 50 in front gear set 12 to ring gear 58 in rear gear set 14. This reverses the thrust reaction on sun gear 50 causing it to move leftward and thus move the ring member 198 to close the passage end 196. With passage 194 thus closed, exhaust of fluid from chamber 189 of the 1-2 transition valve 100 is prevented. This causes the pressure in chamber 189 to immediately rise to full main line pressure which pressure acting in chamber 189 is effective to bias the 1-2 transition valve 100 to its shift-permit position in which it connects the exhaust line 134 to the exhaust port 188 to thus release the clutch 28.

Thus, on shifting from the first to the second forward drive, the 1-2 transition valve 100 maintains the first forward drive engaged to drive the load until the second forward drive is established with sufficient torque capacity to drive the load. This positively prevents drive interruption on such shifting and also provides a smooth feeling shift.

The above-described embodiment is illustrative of the invention which may be modified within the scope of the appended claims.

I claim:

1. In a control system for a transmission the combination of transmission means including gearing and a plurality of fluid pressure operated drive establishing means for providing a plurality of different transmission drives to drive a load on selective delivery of fluid pressure to said fluid pressure operated drive establishing means, a source of fluid pressure, shift valve means for determining selective delivery of fluid from said source to said fluid pressure operated drive establishing means to effect establishment of and shifting between said transmission drives, said gearing including a member that undergoes a load reversal when one of said transmission drives is released and another of said transmission drives is established to transmit torque to drive the load, and transition valve means controlled by said gearing member on shifting from said one transmission drive to said another transmission drive for maintaining fluid pressure in the fluid pressure operated drive establishing means establishing said one transmission drive to maintain said one transmission drive until said another transmission drive is established with sufficient torque capacity to drive the load.

2. In a control system for a transmission the combination of transmission means including gearing and a plurality of fluid pressure operated drive establishing means for providing a plurality of different transmission drives to drive a load on selective delivery of fluid pressure to said fluid pressure operated drive establishing means, a source of fluid pressure, shift valve means operable in one condition to provide for delivery of fluid from said source to one of said fluid pressure operated drive establishing means to establish one of said transmission drives and operable in another condition to provide for delivery of fluid from said source to another of said fluid pressure operated drive establishing means to establish another of said transmission drives while providing for exhaust of fluid from said one fluid pressure operated drive establishing means to release said one transmission drive, transition valve means operable in one condition to prevent exhaust of fluid from said one fluid pressure operated drive establishing means when said shift valve means is in its said other condition to effect maintenance of said one transmission drive while said shift valve means is in its said other condition providing for establishment of said other transmission drive, said transition valve means operable in another condition to exhaust said one fluid pressure operated drive establishing means when said shift valve means is in its said other condition to effect release of said one transmission drive when said another transmission drive is established, means normally yieldingly holding said transition valve means in its said one condition, said gearing including a member that undergoes a load reversal on shifting from said one transmission drive to said other transmission drive, and bias means controlled by said gearing member for biasing said transition valve means to its said other condition to permit release of said one transmission drive only when said other transmission drive is established with sufficient torque capacity to drive the load.

3. In a control system for a transmission the combination of transmission means including gearing and a plurality of fluid pressure operated drive establishing means for providing a plurality of different transmission drives to drive a load on selective delivery of fluid pressure to said fluid pressure operated drive establishing means, a source of fluid pressure, shift valve means operable in one condition to provide for delivery of fluid from said source to one of said fluid pressure operated drive establishing means to establish one of said transmission drives and operable in another condition to provide for delivery of fluid from said source to another of said fluid pressure operated drive establishing means to establish another of said transmission drives while providing for exhaust of fluid from said one fluid pressure operated drive establishing means to release said one transmission drive, transition valve means operable in one condition to prevent exhaust of fluid from said one fluid pressure operated drive establishing means via said shift valve means when said shift valve means is in its said other condition to effect maintenance of said one transmission drive while said shift valve means is in its said other condition providing for establishment of said other transmission drive, said transition valve means operable in another condition to exhaust said one fluid pressure operated drive establishing means via said shift valve means when said shift valve means is in its said other condition to effect release of said one transmission drive when said another transmission drive is established, means normally yieldingly holding said transition valve means in its said one condition, fluid chamber means connected through a fluid restriction to receive fluid from said source for effecting a fluid pressure bias to urge said transition valve means to its said other condition, exhaust passage means connected to said fluid chamber means, and said gearing including a member that undergoes a load reversal on shifting from said one transmission drive to said other transmission drive and is operable when said one transmission drive is driving the load to provide for opening said exhaust passage means to exhaust said fluid chamber means to permit maintenance of said transition valve means in its said one condition by said biasing means and is further operable on establishment of said other transmission drive with sufficient torque capacity to drive the load to then close said exhaust passage means to permit pressure buildup in said fluid chamber means so that said transition valve means is pressure biased to its said other condition to only then permit release of said one transmission drive whereby said one transmission drive is maintained until said other transmission drive is established with sufficient torque capacity to drive the load.

* * * * *